United States Patent [19]

Schmall

[11] 3,970,911

[45] July 20, 1976

[54] APPARATUS FOR DISTANCE CONTROL

[75] Inventor: Karl Heinz Schmall, Baden-Baden, Germany

[73] Assignee: Precitec GmbH, Baden-Baden, Germany

[22] Filed: June 14, 1974

[21] Appl. No.: 479,356

[30] Foreign Application Priority Data

June 29, 1973 Germany............................ 2333089

[52] U.S. Cl............................... 318/607; 318/619; 318/662; 219/69 G
[51] Int. Cl.² .......................................... G05B 1/01
[58] Field of Search .......... 318/607, 606, 619, 662, 318/676; 219/69 G

[56] References Cited

UNITED STATES PATENTS

| 2,164,728 | 7/1939 | Wey ..................................... 318/619 |
| 2,473,401 | 6/1949 | Wild ..................................... 318/607 |
| 2,744,227 | 5/1956 | Spindler, Jr..................... 318/619 X |
| 2,836,721 | 5/1958 | Ratcliffe ........................ 318/606 X |
| 3,349,303 | 10/1967 | Burnight et al..................... 318/606 |
| 3,486,090 | 12/1969 | Auvil .............................. 318/607 X |
| 3,505,606 | 4/1970 | Werner........................... 318/619 X |
| 3,845,377 | 10/1974 | Shimotori .......................... 318/662 |

FOREIGN PATENTS OR APPLICATIONS

| 648,625 | 4/1949 | United Kingdom................. 318/607 |
| 530,410 | 12/1940 | United Kingdom................. 318/607 |

Primary Examiner—B. Dobeck
Attorney, Agent, or Firm—Connolly and Hutz

[57] ABSTRACT

The distance between a cutting torch and a work piece varies the oscillating frequency of the electrical control circuit. This frequency is converted by a discriminator into direct current signals, which are utilized to correct the deviations and hold the torch at a substantially constant distance from the work piece. As the torch moves away from the work piece, the bandwidth of the discriminator is widened, such as by damping or untuning a discriminator tuning circuit. A field-effect transistor is suitable for use as a damping resistor, and a capacitor-diode unit may be used to untune the tuning circuit. The control voltage is conveniently tapped from the output of an amplifier connected to the discriminator, and the control input may be provided to a variable resistor or capacitor. The control voltage for changing the frequency range is conveniently obtained from the analog signal component of the regulator output.

7 Claims, 5 Drawing Figures

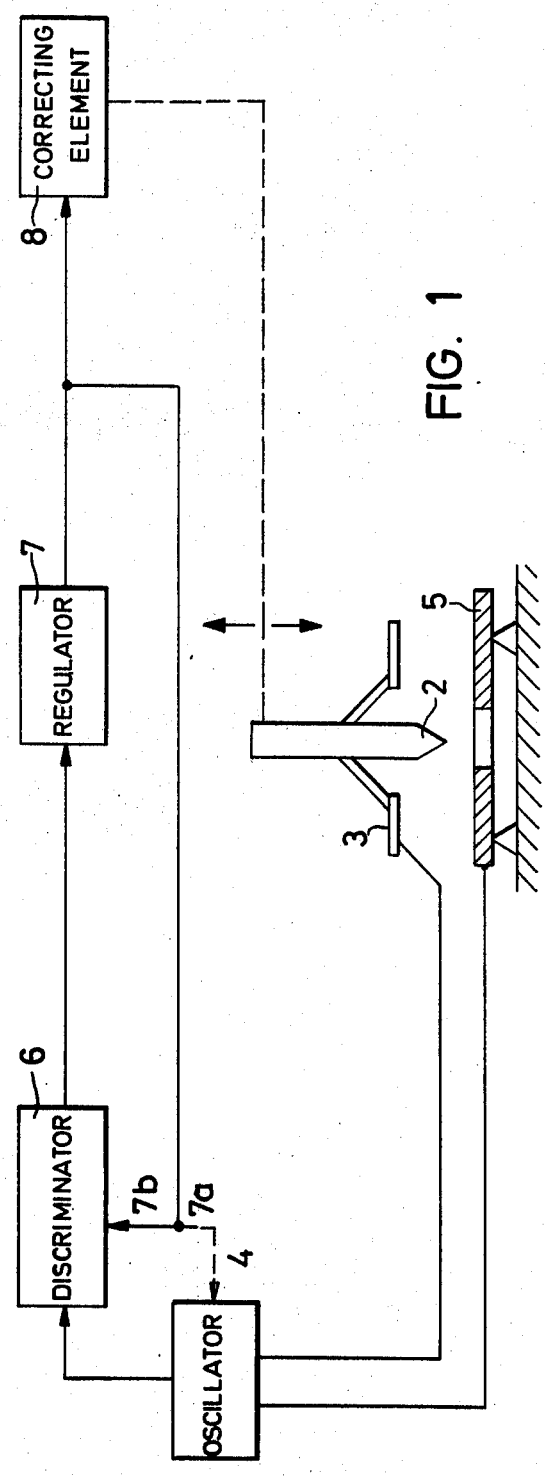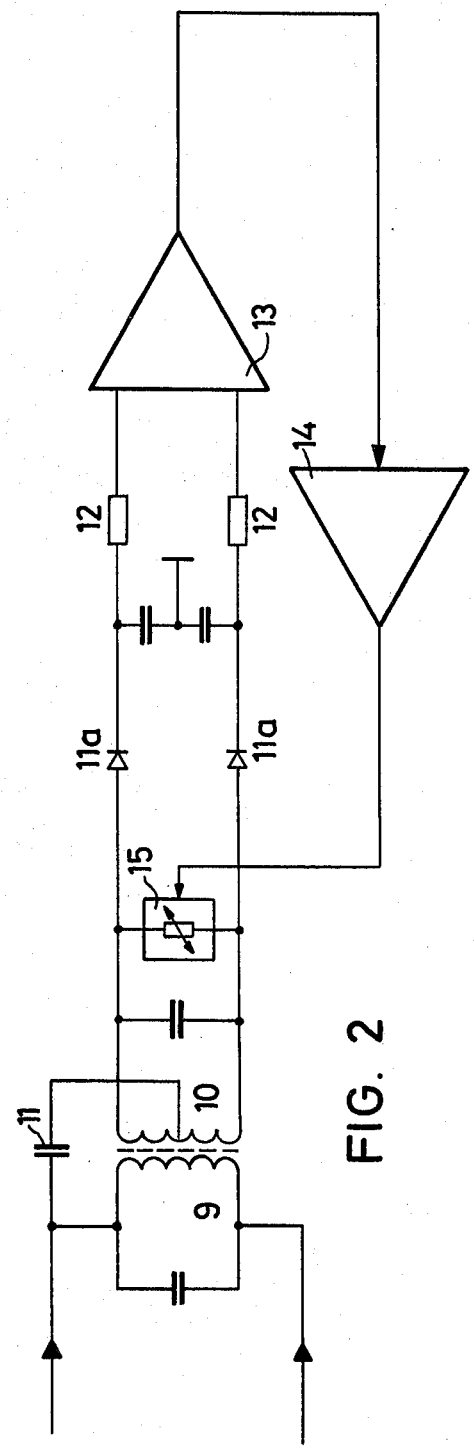

APPARATUS FOR DISTANCE CONTROL

The invention relates to an apparatus for the regulation of distance, particularly for regulating and maintaining substantially constant the distance (between a tool and the surface of a work piece it is processing) by means of an electronic sensing element, which is incorporated into an oscillatory circuit in such a manner that the distance to the work piece determines the oscillating frequency, and that the output signals of the oscillatory circuit are fed to a discriminator for conversion into direct current signals whose polarity and amplitude correspond to the direction and the extent of the regulated deviation.

Such devices are known and in use for the regulation, for example, of the distance between torch and work piece of an automatic cutting-torch apparatus of various types.

A problem with such devices consists particularly in that the discriminator characteristic curve must be as steep as possible to increase the exactness of regulation, however, the lock-in range is thereby reduced, i.e. the range wherein the moving tool may automatically be brought to the predetermined distance on the other hand is reduced.

The object of the invention is to avoid the drawbacks of the known apparatus, particularly to provide a device for distance control, wherein the optimum regulating exactness is assured by the steep slope of the discriminator characteristic curve on the one hand; however, the lock-in range, i.e. the range wherein the regulator is operative, on the other hand, is considerably increased.

According to the invention, this is achieved in the simplest manner in that the frequency range of the discriminator and/or oscillator is adjusted with increasing distance between sensing element and work piece.

This is achieved most advantageously in that the bandwidth of the discriminator is widened, which may be achieved by damping at least one discriminator tuning circuit. Another advantageous realization possibility is afforded when at least one discriminator oscillatory circuit is untuned.

The novel apparatus may be utilized reliably and with the lowest expenditure of structural elements particularly when in at least one oscillatory circuit of the discriminator there is provided a damping resistor, variable by a control voltage. In this connection, the resistor may be formed as a potentiometer, as a gradually adjustable resistor, or also as a semiconductor structural unit. For this purpose, a field-effect transistor is particularly suitable. According to the invention, for the oscillatory circuit untuning, it is particularly suggested to provide in at least one oscillator circuit of the discriminator and/or oscillator, a capacitor, variable by a control voltage, preferably a variable capacitor diode.

For the obtainment of the control voltage it is recommended simply to a tap at the output side a certain portion of voltage from the amplifier connected to the discriminator and to supply it to the control input of the variable resistor or of the variable capacitor. The control voltage for the frequency range change may be obtained in a simple manner at the regulator output, to the extent that it emits analog signals to the correcting element.

The novel content and technical progress of the subject matter of the application are supported both by the novel individual characteristics as well as particularly by the combination of subcombinations and all characteristics being utilized.

Novel features and advantages of the present invention will become apparent to one skilled in the art from a reading of the following description in conjunction with the accompanying drawings wherein similar reference characters refer to similar parts and in which:

FIG. 1 is a block schematic diagram of a regulator which is one embodiment of this invention;

FIG. 2 is a schematic diagram of a discriminator for use with the embodiment shown in FIG. 1;

Figure 3:
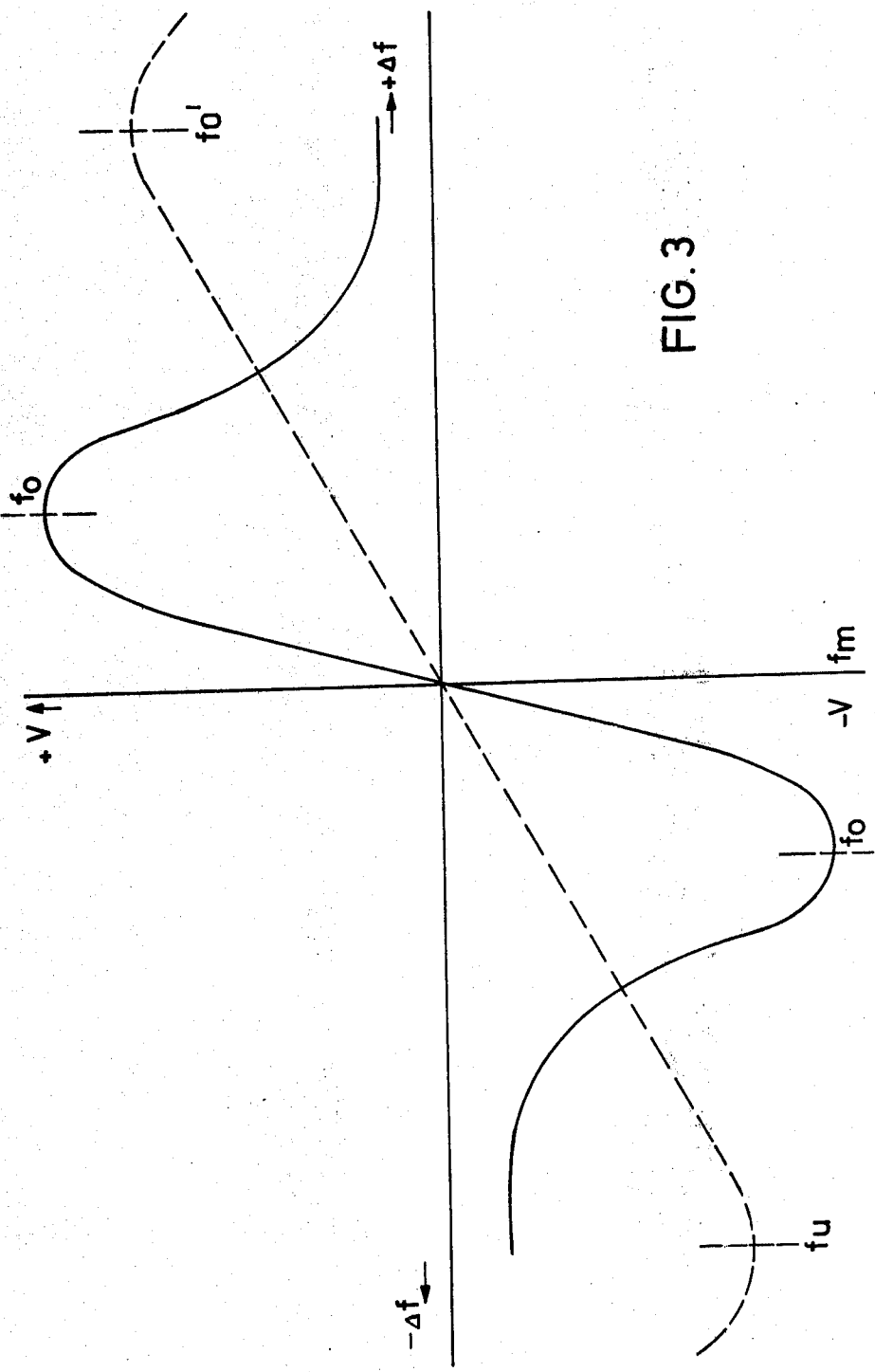
FIG. 3 is the output characteristic curve of the discriminator shown in FIG. 2.

According to FIG. 1, nozzle 2 of an unillustrated cutting-torch machine is provided with a sensing element 3, which in turn is connected to an oscillator 4. Nozzle 2 is moved over a steel plate 5, which in turn is similarly connected with oscillator 4. The capacitance between sensing element 3 and steel plate 5 is incorporated into the oscillator circuit of oscillator 4 in such a manner that each distance change between nozzle 2 and steel plate 5 leads to a frequency change of oscillator 4. The output signals of oscillator 4 are transmitted to a discriminator 6, which in turn transmits a voltage to a regulator 7, which corresponds in amplitude and polarity to the deviation of oscillator 4 from the center frequency of discriminator 6, representing a predetermined or preset value. As soon as a voltage is applied at the output of discriminator 6, which corresponds to a deviation, a correcting element 8 is affected with correcting signals by means of regulator 7 in such a manner that by means of the correcting element, nozzle 5 is again regulated to the predetermined distance. Discriminator 6, in this connection is formed with an extremely steep characteristic curve in view of the regulating exactness. In order to widen the range of regulation, i.e. the range wherein nozzle 2 is automatically regulated to the predetermined distance from steel plate 5, the output of regulator 7 is connected by means of control leads 7a and 7b with oscillator 4 or discriminator 6 in such a manner that upon the lowering of the analog voltage applied at the regulator output, the frequency range of discriminator 6 is enlarged and, in addition, oscillator 4 is untuned. The untuning is designed in such a manner that the frequency of the signals emitted from discriminator 6 is untuned in the direction of an apparent approach of sensing element 3 to steel plate 5, i.e. that the frequency is untuned in the direction of the central frequency of discriminator 6, whereby the latter transmits signals to regulator 7 even at a great distance of nozzle 2 from steel plate 5. As soon as nozzle 2 nears steel plate 5 due to the activation of correcting element 8, the voltage at the output of regulator 7 is decreased, so that discriminator 6 returns to its predetermined frequency range and oscillator 4 similarly achieves again its normal frequency.

FIG. 2 shows a discriminator 6 with a first tuning circuit 9 and a second tuning circuit 10, which are coupled capacitively by means of a capacitor 11 as well as inductively by means of the circuit coils. Both tuning circuits are adjusted in a known manner to different frequencies, so that depending on the frequency, which is transmitted to the first tuning circuit 9, a voltage, fluctuating in polarity and in amplitude, is transmitted by means of diodes 11a and resistors 12 to the inputs of sum-and-difference amplifier 13. The voltage emitted from amplifier 13 is illustrated in FIG. 3 as depending on the frequency, wherein $fm$ represents the center frequency of the circuits 9 and 10, $fo$ the upper frequency limit, $fu$ the lower frequency limit of the discriminator circuit.[1]

[1] $fu'$, $fu''$, $fo'$, $fo''$, $fm'$, $fm''$ represents new velocities by change of lower limit, upper limit and center frequency by detuning of discriminator circuit when amplifier 13 produces an output voltage.

Obviously, the frequency range used for controlling regulator 7 (FIG. 1) hardly exceeds the lower and upper frequency limits because of the steep discriminator characteristic curve. Thus, the lock-in range of the control circuit is also limited, since a regulator output and thus a guidance of the correcting element may only be achieved if at the discriminator output voltage values are emitted with a certain minimum amplitude. In order to enlarge the lock-in range of a regulator circuit equipped with such a discriminator, a voltage value is tapped off at the output of sum-and-difference amplifier 13 in accordance with FIG. 2 and is conducted to variable resistor 15, illustrated symbolically, by means of an amplifier 14. Upon the lowering of the voltage at the output of amplifier 13, the resistor 15 is controlled in such a manner that — as illustrated by broken lines in FIG. 3 — discriminator 6 is damped and thus by means of a new upper frequency $fo$ and new lower frequency $fu$ a considerably greater frequency range is provided, wherein utilizable signals are emitted by means of discriminator 6. In this manner, it is possible with the simplest means to enlarge the lock-in range of a thusly-equipped regulator circuit. In this connection, a correcting resistor or even a semiconductor electronic component such as a field-effect transistor may advantageously be employed as the variable resistor. To the extent that the frequency range of the discriminator is sufficiently enlarged by the damping, a supplemental frequency change of the oscillator — as illustrated in FIG. 1 — may also be omitted.

Figure 4:
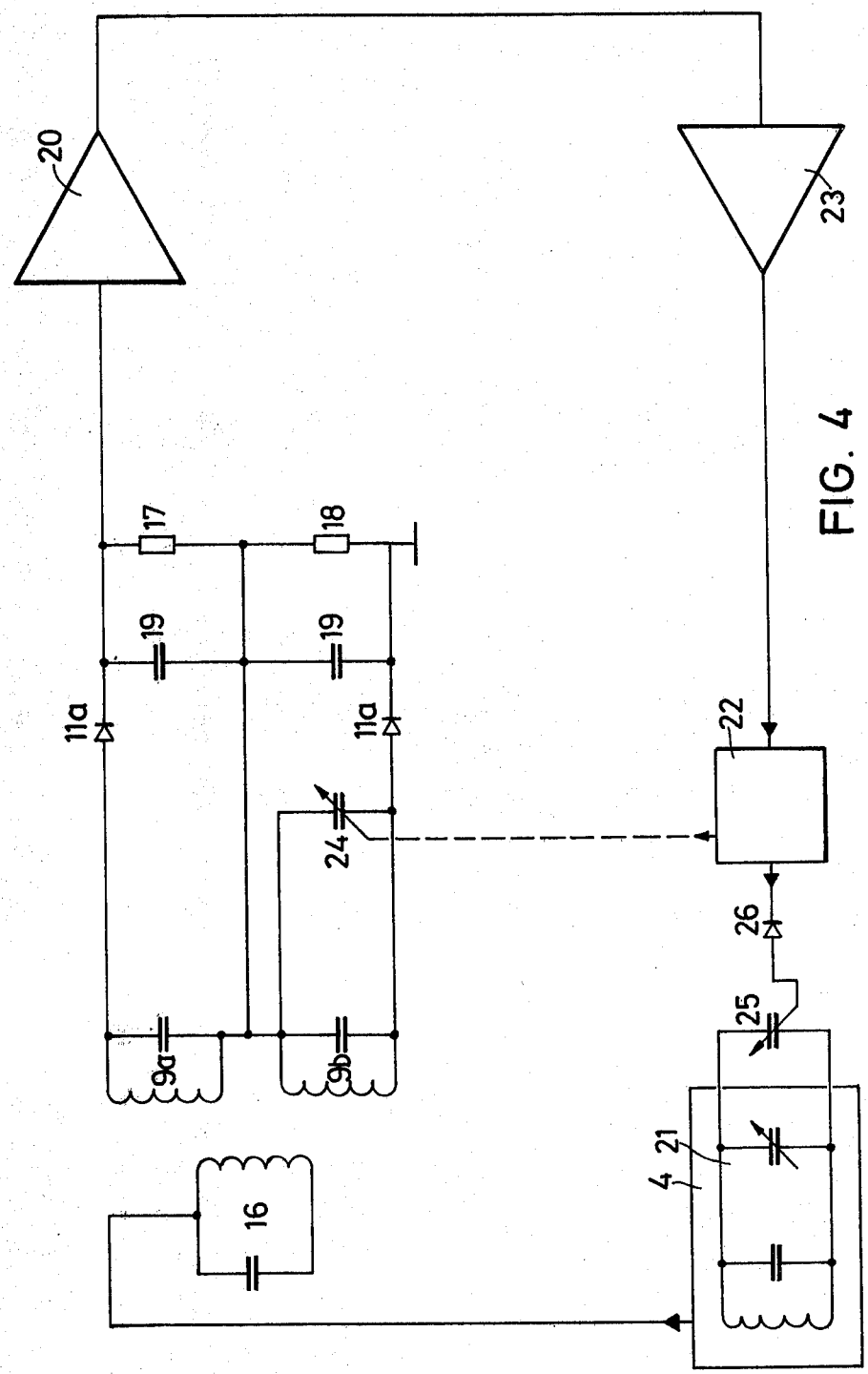
FIG. 4 is a schematic diagram of the coupling of a discriminator and an oscillator having the characteristics of the invention.
Figure 5:
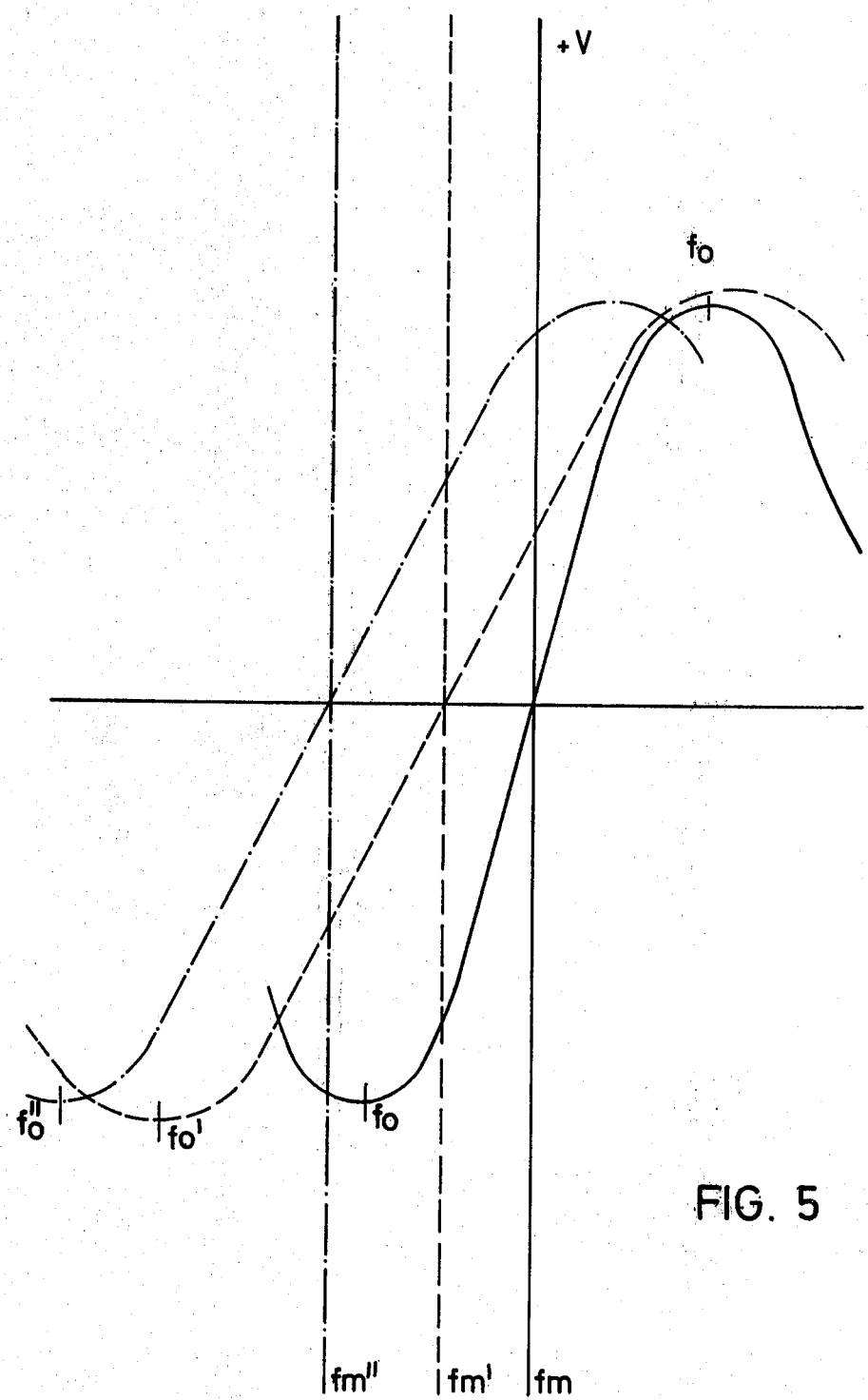
FIG. 5 is the voltage characteristic curve at the discriminator output of the circuit of FIG. 4.

FIG. 4 shows a modified exemplary embodiment of a discriminator 6, which is coupled by means of an oscillator circuit 16 with an oscillator 4. A first discriminator-tuning circuit 9a and a second discriminator-tuning circuit 9b are connected by means of diodes 11a to resistor 17, 18, the tuning circuits 9a, 9b being adjusted to a different frequency $fu$ or $fo$, as the case may be, in accordance with FIG. 5. Depending on the frequency of oscillator 4, a voltage of fluctuating amplitude and polarity is transmitted to output amplifier 20 in a known manner by means of diodes 11a and resistors 17, 18 as well as capacitor 19. Amplifier 20 being connected to the input of an unillustrated regulator.

As illustrated schematically, oscillator 4 has a variable capacity 21, which corresponds to the distance of a sensing element from the work piece (e.g. the distance of sensing element 3 from steel plate 5 as shown in FIG. 1). The frequency of tuning circuits 9a, 9b as well as of oscillator 4 is adjusted in such a manner that upon reaching the predetermined tool-to-work piece distance, the central frequency of the discriminator is obtained and consequently no signal is emitted by output amplifier 20. In order to enlarge the lock-in range of the switch, a variable capacitor 24 is connected parallel to the second tuning circuit 9b, the capacitor being controlled by a control device 22 in accordance with the voltage at the output amplifier 20.

For intensifying the voltage at output amplifier 20, an amplifier 23 is connected to control device 22. Upon falling short of a predetermined minimum value at output amplifier 20, the variable capacitor 24 is affected by control signals in such a manner that the second tuning circuit 9b is untuned to a new lower frequency $fu$, so that the frequency range of the discriminator becomes enlarged. In addition, a second variable capacitor 25 is affected with control signals by means of control device 22, said capacitor being connected parallel to the oscillator circuit of oscillator 4. As soon as the signals emitted by the control device have exceeded a certain maximum value, which corresponds to a minimum voltage at the output amplifier 20, the threshold voltage of the schematically-illustrated limiter 26 is overcome and the frequency of oscillator 4 is untuned in such a manner that an approach to the discriminator frequency is achieved. Thus, the discriminator has an apparent new lower frequency $fu$, whereby — as clearly visible from FIG. 5 — the frequency range and consequently the lock-in range of the regulator circuit is further enlarged.

The dimensions and the selection of the electrical components, illustrated schematically in the exemplary embodiments, should present no difficulties for one skilled in the art, hence a detailed illustration is omitted.

I claim:

1. An apparatus for the regulation of distance, particularly for the regulation of maintaining substantially constant the distance between a tool and the surface of a workpiece to be processed by means of an electronic sensing element, which is incorporated into an oscillator circuit of an oscillator in such a manner that the distance to the workpiece determines the oscillating frequency, and that the output signals of the oscillator are fed to a discriminator for conversion into direct current output-signals whose polarity and amplitude correspond to the direction and the extent of the regulating deviation, characterized in that the oscillator and the discriminator have tuning circuits in electrical contact between the tool and the workpiece which are variable by means of the output signals, a tool position-correcting element being connected to the tool towards and away from the workpiece, and the oscillator and discriminator being electrically connected to the tool position-correcting element for regulating the position of the tool to be substantially constant from the workpiece.

2. An apparatus of claim 1, characterized in that the tuning circuit of the discriminator is provided with a damping resistor variable by means of the output signals.

3. An apparatus of claim 1, characterized in that the tuning circuit of the discriminator is provided with a field-effect transistor, variable by means of the output signals.

4. An apparatus of claim 1, characterized in that the tuning circuits of the discriminator and the oscillator are provided with capacitors, variable by means of the output signals.

5. An apparatus for the regulation of distance, particularly for the regulation and maintaining substantially constant the distance between a tool and the surface of a workpiece to be processed by means of an electronic sensing element, which is incorporated into an oscillator circuit of an oscillator in such a manner that the distance to the workpiece determines the oscillating frequency, and that the output signals of the oscillator circuit are fed to a discriminator for conversion into direct current output signals whose polarity and amplitude correspond to the direction and the extent of the regulating deviation, characterized in that the discriminator has two tuning circuits, a first variable capacitor is connected parallel to one of the tuning circuits, and the variable capacitor is connected to a control device for controlling the variable capacitor in accordance with the output signals.

6. An apparatus of claim 5, characterized in that a second variable capacitor is connected to the control device for supplying it with control signals by means of the control device, and the second capacitor being connected parallel to the oscillatory circuit of the oscillator.

7. An apparatus of claim 5, wherein an amplifier is connected to the discriminator for receiving the input of the discriminator, the variable capacitor having a control input and the amplifier being connected to the control input.

* * * * *